Jan. 11, 1938. W. S. SAUNDERS 2,104,771
STORAGE BATTERY INSTALLATION
Filed Aug. 21, 1936 2 Sheets-Sheet 1
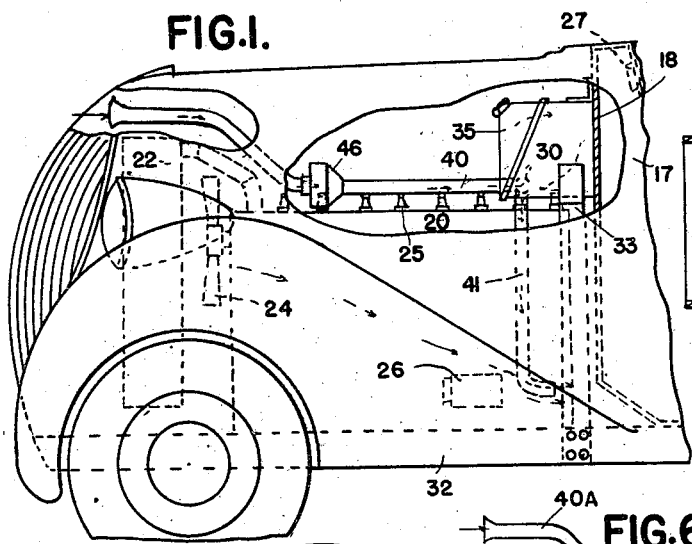
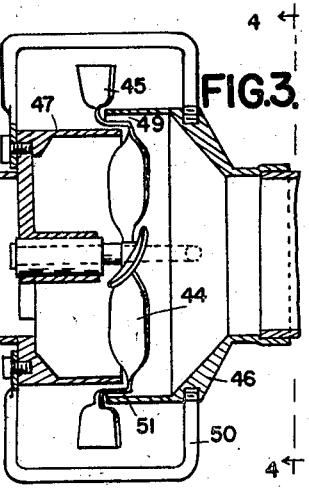
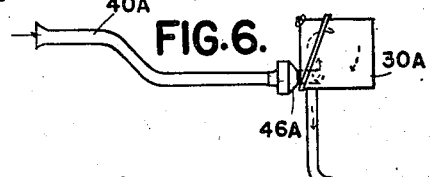
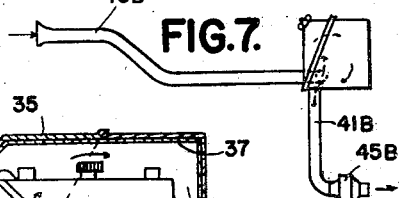
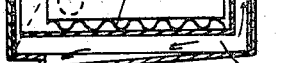
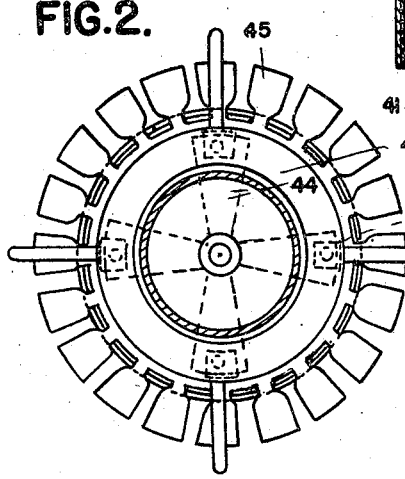
INVENTOR
WALTER S. SAUNDERS
BY
ATTORNEYS

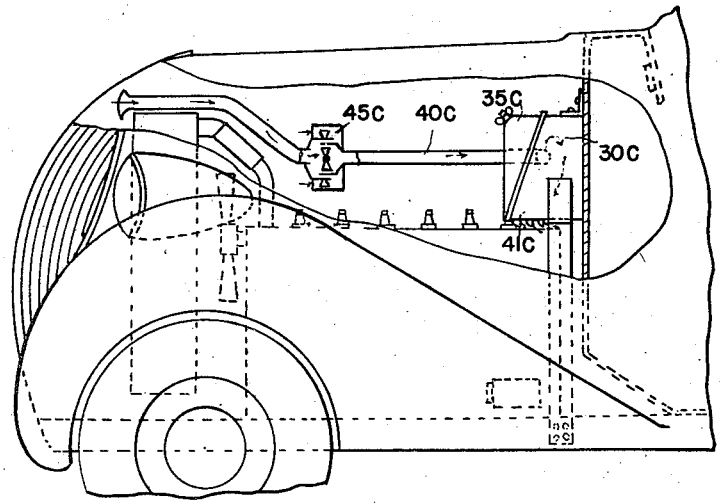
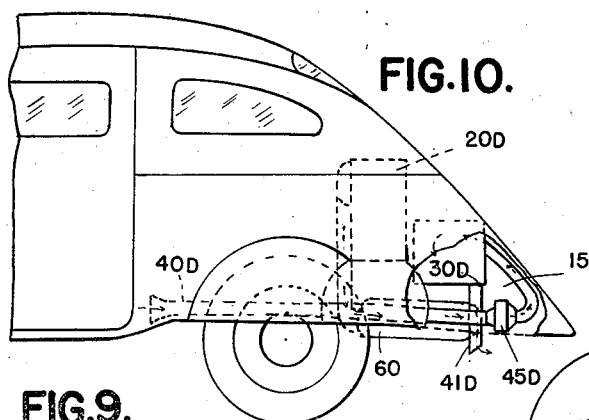
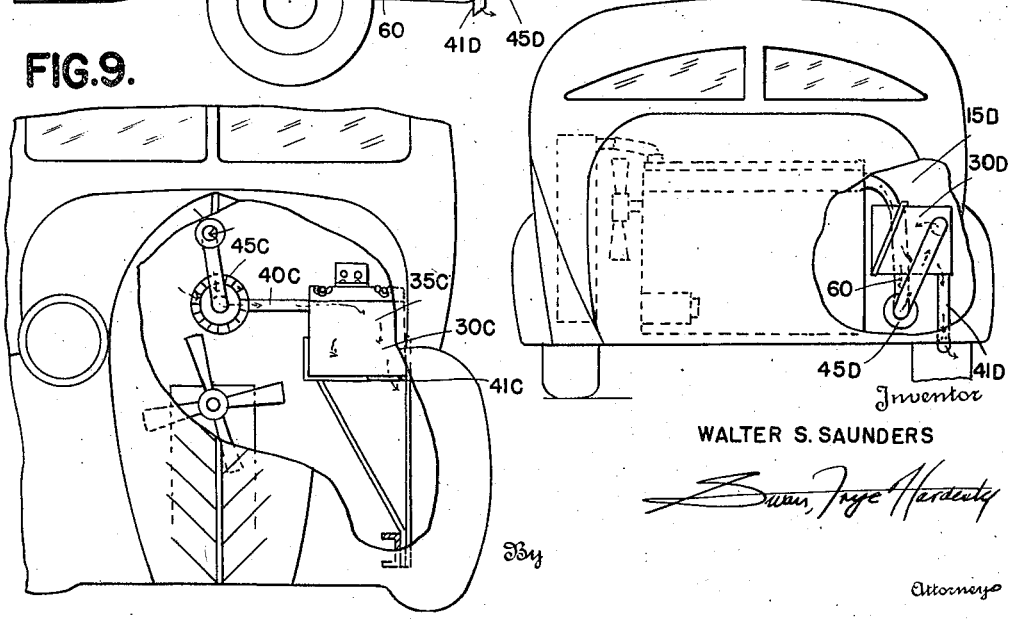

Patented Jan. 11, 1938

2,104,771

UNITED STATES PATENT OFFICE 2,104,771

STORAGE BATTERY INSTALLATION

Walter S. Saunders, Pontiac, Mich., assignor to The American Forging & Socket Company, Pontiac, Mich., a corporation of Michigan Application August 21, 1936, Serial No. 97,214

5 Claims. (Cl. 180—68.5)

This invention concerns storage battery installations, and the cooling and ventilation of storage batteries, particularly when installed in relatively hot locations, as for example, in close relation to engines and the like, as in automotive vehicles, where considerations of economy make desirable the location of the battery in close proximity to the engine, and, especially where the engine is located at the front of the vehicle, as close as is practicable to the electrically operable devices mounted, usually upon an instrument panel, or near the dashboard which serves to separate the engine compartment from the passenger compartment of the vehicle.

The present invention has for a particular object the provision of improved means for supporting and housing the storage battery of such an automotive vehicle, in or partly in the engine compartment, and for cooling and ventilating the same.

A further important object lies in the provision of means for inducing an air draft through the battery box and over the battery, which means is operated by the air blast from the engine fan, but delivers to the battery box unheated air taken from in front of the radiator or outside the engine compartment.

Another object lies in the provision in combination with such a vehicular storage battery installation of improved ventilating means incorporating a draft-inducing fan operable by heated air, but which may be used to deliver to the desired designation air other than that by which the fan is operated.

Another object comprises the provision of improved means having the aforementioned advantages and especially suitable for incorporation in vehicles having rear mounted engines.

Other objects and advantages will be apparent from the following description, wherein reference is made to the accompanying drawings illustrating preferred embodiments of my invention, and wherein similar reference numerals designate similar parts throughout the several views:

In the drawings:

Figure 1 is a somewhat diagrammatic and fragmentary side elevational view of the front portion of a motor car provided with a battery installation incorporating the principles of this invention, partly being broken away to afford a better view of the elements most directly related to the invention.

Figure 2 is a front elevational view of the same, likewise of fragmentary and diagrammatic character, and similarly broken away to afford a better view of the parts.

Figure 3 is an enlarged substantially diametrical cross section of the draft fan.

Figure 4 is a cross section thereof taken substantially on the line 4—4 of Figure 3 and looking in the direction of the arrows.

Figure 5 is a cross sectional view of the battery box, showing the battery in side elevation.

Figures 6 and 7 are side elevational views, of schematic and diagrammatic character, showing somewhat modified constructions and indicating optional variations of draft-fan placement.

Figures 8 and 9 are side and front elevational views, respectively, similar to Figures 1 and 2, of a somewhat modified construction.

Figure 10 is a fragmentary diagrammatic side elevational view of the rear portion of an automotive vehicle having a rear mounted engine, parts being broken away to afford a better view of the battery installation, and Figure 11 is a rear elevational view of the vehicle shown in Figure 10, likewise illustrated in diagrammatic and fragmentary manner.

Reference character 15 designates the engine compartment of a motor car, the passenger compartment of which is illustrated at 17. The two compartments are separated by a dash panel 18. Forward of the dash is the engine 20 which is cooled by means of a cooling radiator 22 and engine-driven fan 24. Appurtenant the engine are one or more electrically operable elements including spark plugs 25 and the electric starter 26. In the passenger compartment and close to the dash may be additional electrically operated elements, such as the ammeter 27 shown as mounted upon an instrument panel (undesignated). In order that the battery may be located as closely as is practicable to those electrical elements to which heavy wiring from the battery is required, I preferably mount the battery box 30 directly in the engine compartment and against the dash panel, supporting the same, however, from the frame 32, as by uprights 33, in order to relieve the dash of stresses due to the weight of the battery.

The box 30 is preferably tightly closed, as by the cover 35, and may be insulated against the heat of the engine, as by the internally applied insulation 37. Air may be introduced into the battery box for cooling and ventilation through an air inlet tube 40, which in the shown construction is extended forwardly, over the engine and the radiator, to a position in advance of all parts which are heated by the engine, where its open mouth is adapted to intercept unheated air.

A draft-inducing fan is so arranged in the inlet tube as to lie in the path of the air blast from the engine fan 24, by which air blast the fan is operated. The draft fan comprises a rotor carrying two concentric fan blade assemblies. The inner set of blades 44, is arranged inside the substantially cylindrical fan casing, while the outer blades, 45, although rotatable as a unit with and carried by the internal blades 44, project from the outside of the casing into the path of the air blast from fan 24. The casing comprises a pair of interfitted bell sections 46—47. Section 47, which is nearer the air inlet, is materially smaller than the section 46, and through the annular gap 49 thus provided extends the connecting portion 51 which joins the two fan blade sections 44—45, the parts being of course freely rotatable. Bridging the gap and the blades 45 are bars 50, which serve to rigidly position the casing sections 46—47 with respect to each other, and to act as guards for the blades 45. It will be seen that blades 44 occupy but a small percentage of the cross sectional area of the interior of the inlet pipe 40, and that the disposition of the mouth of the pipe is such that the movement of the vehicle through the air tends to induce inflow of air to the box, while the location of the draft fan in such position that the blades 45 are in the path of the blast from fan 24 provides for positive circulation through the box, inasmuch as the fan section 45 serves as a motor to drive the blower section 44 so long as the engine is running and a blast is generated by the engine fan 24.

In the modified construction shown in Figure 6, the blast fan casing section 46A is directly mounted upon the battery box 30A. In this and in the previously described construction, the inlet tube may, as best shown in Figure 5, extend inside the box to a position near the back thereof and behind the upstanding baffle wall 55 which is continuous with the raised sheet metal platform 56 upon which the battery 30 stands, the arrangement being such that inflowing air is made to travel over the battery before it can pass out the discharge pipe 41. The cover section 35 may be cut away around the inlet pipe, and such cut out opening may extend to the bottom of the cover section, in order that removal of the latter may be effected without interference with the pipe.

A further modification, indicated in Figure 7, incorporates a similar draft-inducing fan, generally designated 45B, arranged in the discharge pipe 41B and located in the path of air flow around and beneath the motor, in such position that rotation of the fan, which acts to withdraw air from the box, is induced by the air flow beneath the vehicle and around the motor. The inlet pipe 40B may be extended to a similar position forward of the motor and radiator, or otherwise suitably located to intercept unheated air.

The modification shown in Figures 8 and 9, generally similar to that first disclosed, includes a similarly located and positioned battery box 30C into which an inlet air tube 40C projects, the inlet tube in this case discharging within the cover section 35C of the box, while the similarly located and operated draft fan incorporated therein is generally designated 45C. The inlet tube 40C is preferably formed (partly or entirely) of flexible material, in order that the cover may be freely removed and replaced. The air is discharged from the box through outlet louvers 41C, formed in the bottom of the same.

The construction shown in Figure 10, especially suitable for rear mounted engines, includes a battery box 30D arranged in the rear engine compartment 15D. The air inlet conduit 40D is shown as opening and adapted to take air from inside the vehicle body. In conduit 40D, in such position as to be engaged by the air stream beneath the vehicle, is a draft fan 45D operable by such flow of air to force air to the battery casing through the pipe 40D. The exhaust pipe 60 is also arranged to direct at least a part of the exhaust gases from the engine against the outside or motor blades of the draft fan 45D, thereby insuring positive air circulation so long as the engine is running. Air is discharged from the box through an outlet tube 41D, which may also project to such a position in and open in the direction of the air stream beneath the vehicle, in order that by ejecting action the air flow through the box may be assisted.

What I claim is:

1. In combination with an automotive vehicle incorporating electrically operable elements and including a frame, an engine compartment, an engine located in said engine compartment, one or more of said electrically operable elements being appurtenant the engine, a cooling radiator and engine driven fan for dissipating the excess heat of the engine, a storage battery for supplying current to said electrically operable elements, and ventilated supporting means for said battery comprising a battery box having at least a portion in but constituting an enclosure distinct from the engine compartment, said box having air inlet and discharge portions, and means for inducing a positive circulation of air through the box including a draft fan assembly connected to one of said portions and comprising a casing, a blower fan portion within the casing, a motor fan portion outside the casing and connected to the blower fan portion to drive the same, said motor fan portion being located in and operable by an air draft which normally occurs over a portion of the vehicle when in operation.

2. Apparatus as set forth in claim 1 including an inlet conduit connected to said inlet portion and extending to a position away from elements heated by the waste heat of the engine, said conduit having an inlet in such position, whereby it may intercept and deliver to said box air unheated by the vehicle, said motor fan being operated by heated air which has passed over a part heated by the engine.

3. Apparatus as set forth in claim 1 in which said fan assembly is mounted upon said box and connected to said inlet portion.

4. Apparatus as set forth in claim 1 including a discharge conduit connected to said box, said fan assembly being located in said discharge conduit and the motor fan thereof being located in the path of air traveling about the engine.

5. Apparatus as set forth in claim 1 in which said motor fan portion is located in and operable by the blast from the engine-driven fan.

WALTER S. SAUNDERS.